(12) United States Patent
Cecchelli et al.

(10) Patent No.: US 11,913,509 B2
(45) Date of Patent: Feb. 27, 2024

(54) ELECTRIC PARKING BRAKE ACTUATOR MOUNTING ASSEMBLY

(71) Applicant: Continental Teves AG & Co. OHG, Frankfurt am Main (DE)

(72) Inventors: Ivan Cecchelli, Vado Ligure (IT); Libero Magini, Ligurien (IT)

(73) Assignee: Continental Teves AG & Co. OHG, Hannover (DE)

( * ) Notice: Subject to any disclaimer, the term of this patent is extended or adjusted under 35 U.S.C. 154(b) by 681 days.

(21) Appl. No.: 16/994,833

(22) Filed: Aug. 17, 2020

(65) Prior Publication Data

US 2020/0378460 A1    Dec. 3, 2020

Related U.S. Application Data

(63) Continuation of application No. PCT/EP2018/054529, filed on Feb. 23, 2018.

(51) Int. Cl.
*F16D 65/22* (2006.01)
*F16D 65/00* (2006.01)
(Continued)

(52) U.S. Cl.
CPC ......... *F16D 65/22* (2013.01); *F16D 65/0056* (2013.01); *F16D 65/02* (2013.01);
(Continued)

(58) Field of Classification Search
CPC ...... F16D 65/22; F16D 65/0056; F16D 65/02; F16D 2065/1392; F16D 2121/20; F16D 2127/06; F16D 2200/0006
See application file for complete search history.

(56) References Cited

U.S. PATENT DOCUMENTS 2,259,266 A * 10/1941 Rabe ....................... F16D 65/52
188/79.61
4,673,069 A * 6/1987 Staub, Jr. ................ F16D 65/22
188/205 R
(Continued)

FOREIGN PATENT DOCUMENTS

CN     103339401 A    10/2013
CN     203902208 U    10/2014
(Continued)

OTHER PUBLICATIONS

First Office Action (translated and original), dated Mar. 2, 2022, from corresponding Chinese patent application No. 201880089983.7.
(Continued)

*Primary Examiner* — Robert A. Siconolfi
*Assistant Examiner* — James K Hsiao

(57) ABSTRACT

An electric parking brake actuator mounting assembly includes a brake backplate of a drum brake, having a rear surface opposite to a front surface configured to be facing a brake drum when the brake backplate is mounted on a motor vehicle, wherein the rear surface of the brake backplate includes a support base configured to receive a pull spindle of an electromechanical actuator, a supporting bracket including at least one coupling plate, configured to be attached to the rear surface of the brake backplate, and an actuator mounting surface configured to be coupled to and support the electromechanical actuator, wherein the actuator mounting surface includes a spindle seat, configured to receive the pull spindle of the electromechanical actuator, and a pin lock seat, configured to receive and lock an engagement pin of the electromechanical actuator.

18 Claims, 9 Drawing Sheets

(51) Int. Cl.
*F16D 65/02* (2006.01)
*F16D 121/20* (2012.01)
*F16D 127/06* (2012.01)

(52) U.S. Cl.
CPC .. *F16D 2065/1392* (2013.01); *F16D 2121/20* (2013.01); *F16D 2127/06* (2013.01); *F16D 2200/006* (2013.01)

(56) References Cited

U.S. PATENT DOCUMENTS

| | | | | |
|---|---|---|---|---|
| 5,044,475 | A * | 9/1991 | Clark | F16D 65/22 188/250 F |
| 5,310,026 | A | 5/1994 | Shaw et al. | |
| 9,175,737 | B2 * | 11/2015 | Bach | F16D 65/16 |
| 9,915,309 | B2 * | 3/2018 | Gädke | F16D 51/22 |
| 11,248,672 | B2 * | 2/2022 | Bach | B60T 7/085 |
| 2001/0004035 | A1 * | 6/2001 | Asai | F16D 65/22 188/205 R |
| 2002/0007990 | A1 * | 1/2002 | Asai | F16D 65/22 188/74 |
| 2003/0075001 | A1 * | 4/2003 | Petrak | B60T 11/046 74/501.5 R |
| 2006/0081435 | A1 * | 4/2006 | Heinrich | F16D 13/683 192/85.01 |
| 2006/0144658 | A1 * | 7/2006 | Tessitore | F16D 51/22 188/325 |
| 2007/0151818 | A1 * | 7/2007 | Linhoff | F16D 65/14 188/162 |
| 2008/0135349 | A1 * | 6/2008 | Himes | F16D 65/0043 188/156 |
| 2010/0018494 | A1 * | 1/2010 | Obermeier | G01L 19/0061 173/171 |
| 2010/0101068 | A1 * | 4/2010 | Kipp | F16D 65/186 29/402.08 |
| 2013/0153349 | A1 * | 6/2013 | Akada | F16D 51/48 188/325 |
| 2014/0020997 | A1 * | 1/2014 | Bach | F16D 51/46 188/325 |
| 2015/0308528 | A1 | 10/2015 | Ambs et al. | |
| 2016/0010709 | A1 | 1/2016 | Banks et al. | |
| 2016/0102720 | A1 * | 4/2016 | Bach | F16D 65/22 188/327 |
| 2016/0169308 | A1 * | 6/2016 | Drewes | F16D 51/00 188/343 |
| 2017/0009832 | A1 | 1/2017 | Gaedke et al. | |
| 2018/0345936 | A1 | 12/2018 | Maron et al. | |

FOREIGN PATENT DOCUMENTS

| | | | | |
|---|---|---|---|---|
| CN | 106164526 A | 11/2016 | | |
| DE | 102012201579 A1 | 8/2012 | | |
| EP | 2922184 A1 | 9/2015 | | |
| EP | 3163113 A1 | 5/2017 | | |
| EP | 3470279 A1 * | 4/2019 | | B60T 1/067 |
| FR | 3016010 A1 | 7/2015 | | |
| KR | 20130123791 A | 11/2013 | | |
| WO | 2005/070736 A2 | 8/2005 | | |
| WO | 2007/089300 A2 | 8/2007 | | |
| WO | 2017/097696 A1 | 6/2017 | | |

OTHER PUBLICATIONS

International Search Report and Written Opinion dated Nov. 12, 2018 from corresponding International Patent Application No. PCT/EP2018/054529.

* cited by examiner

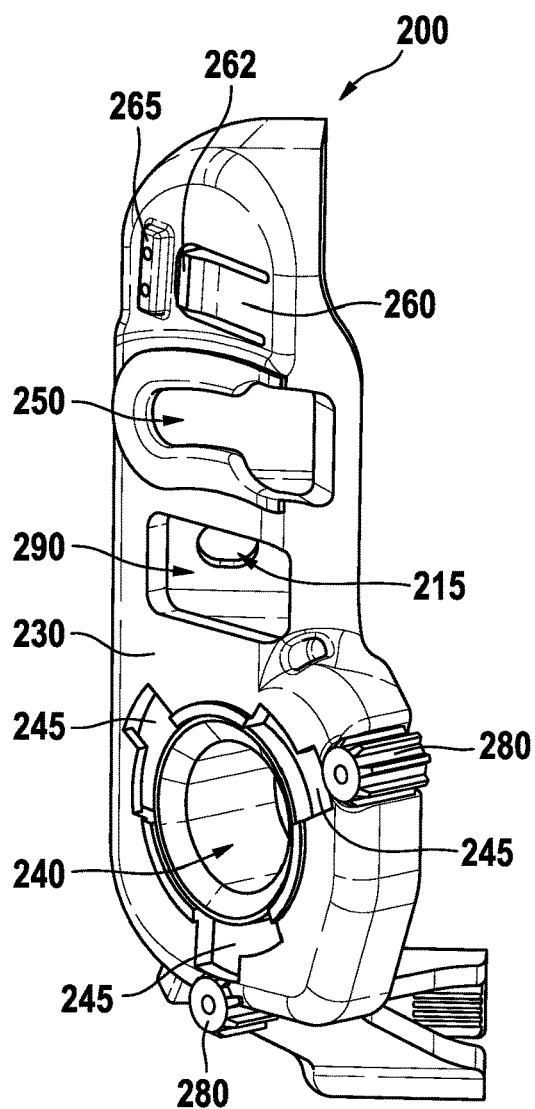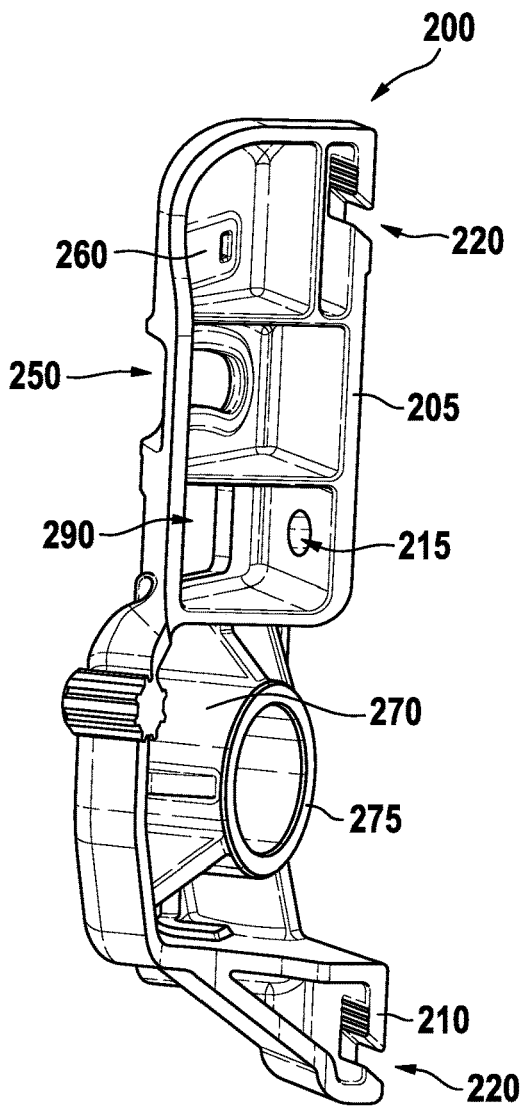
Fig. 2a　　　　Fig. 2b
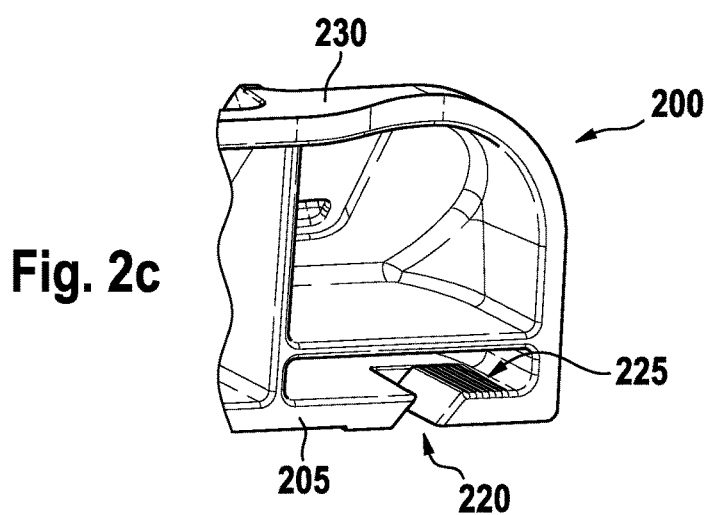
Fig. 2c

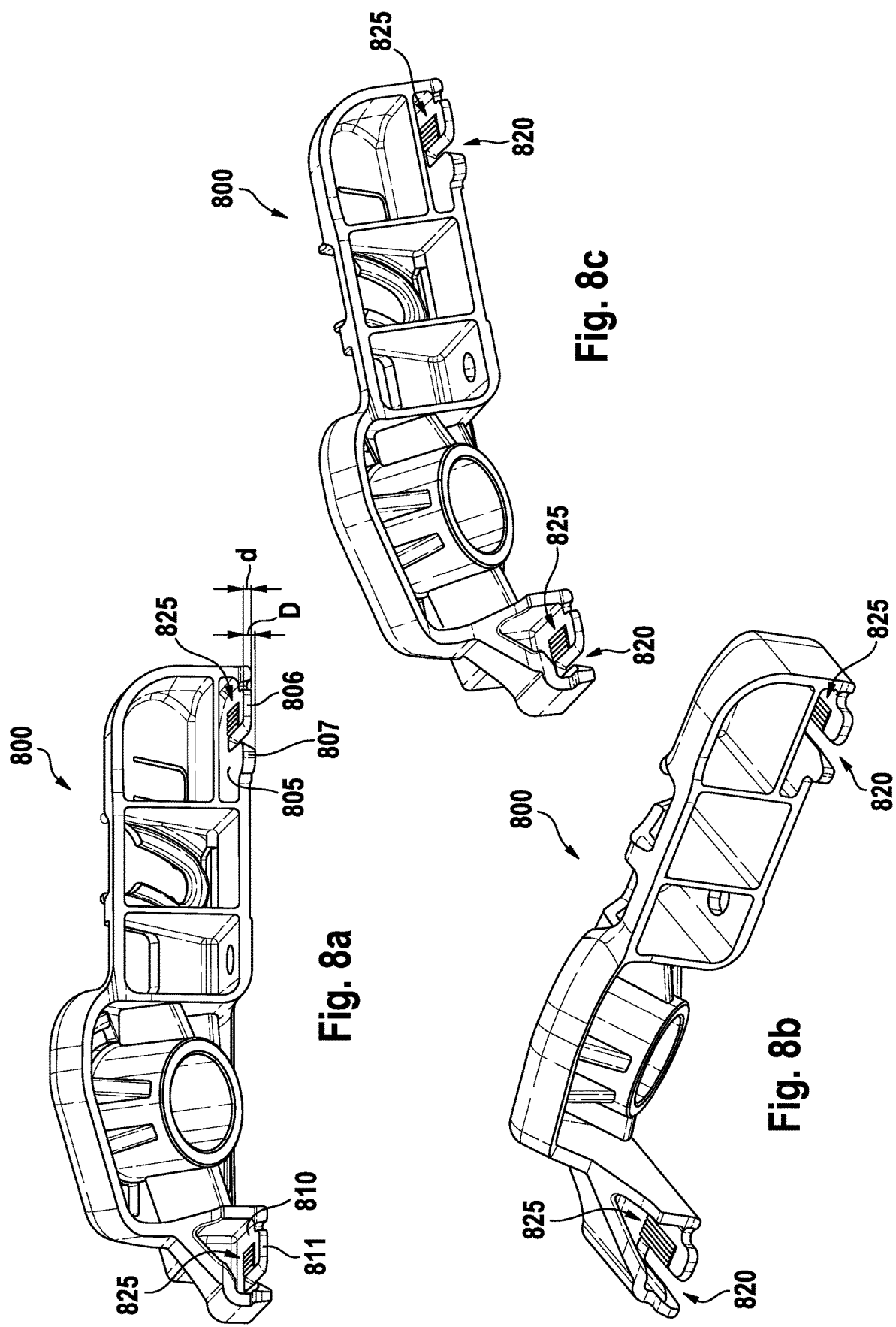

ELECTRIC PARKING BRAKE ACTUATOR MOUNTING ASSEMBLY

CROSS-REFERENCE TO RELATED APPLICATIONS

This application claims priority to PCT Application No. PCT/EP2018/054529, filed Feb. 23, 2018, wherein the contents of such application is incorporated herein by reference.

TECHNICAL FIELD

An electric parking brake actuator mounting assembly.

TECHNICAL BACKGROUND

To meet increasing requirements in regard of safety and comfort, electric parking brakes are progressively replacing mechanical parking hand brakes, namely by replacing the mechanical activation of the brake shoes via the hand brake lever with a user operated electrical switch and electromechanical actuators controlled by the switch to apply the required clamp forces.

A drum brake of a motor vehicle includes a brake backplate and a brake drum. The brake backplate has a central opening allowing an outer end of a rotatable axle to extend therethrough to a wheel of the vehicle. The brake drum is integrally coupled to the rotatable axle so as to rotate therewith, while the brake backplate is usually mounted on the suspension assembly providing a stationary support in relation to the rotating brake drum. A set of brake shoes (usually a pair of brake shoes) are coupled to the brake backplate on the surface thereof facing the brake drum; the brake shoes are configured to be operated by an actuation mechanism to be pushed into contact with the internal surface of the brake drum, thus reducing the rotation speed of the brake drum and, consequently, of the wheel and motor vehicle or operating as a parking brake.

The actuation mechanism can be operated by a brake pedal during movement of the motor vehicle, and by an electromechanical actuator, during parking conditions, including an electric motor configured to move a pull spindle operatively interacting with the actuation mechanism when an electrical switch is operated by a user. The electromechanical actuator is directly attached to the brake backplate, either on the surface of the brake backplate facing the brake drum (i.e. inside the drum brake) or on the opposite surface (i.e. outside the drum brake).

Some electromechanical actuators are disclosed in documents WO 2017/097696 A1, WO 2007/089300 A2, WO 2005/070736 A2, and U.S. Pat. No. 5,310,026 A.

However, prior art electric parking brakes suffer from the drawback that electromechanical actuators, which are directly attached to brake backplates, require a specific design of the actuator housing to adapt to the overall shape and dimensions of the brake and, more in general, to the motor vehicle installation conditions. Consequently, even the configurations of the operating components of an electromechanical actuator may result unsuitable for a number of motor vehicles.

Therefore, the use of standard electromechanical actuators is extremely limited, resulting in high costs of production, installation and maintenance of electric parking brake arrangements.

What is needed is to allow in a simple, reliable, efficient and inexpensive way to use standard actuators for electric parking brake applications in different motor vehicles, reducing costs of production, installation and maintenance of electric parking brake arrangements.

SUMMARY OF THE INVENTION

An electric parking brake actuator mounting assembly comprising:
a brake backplate of a drum brake, having a rear surface opposite to a front surface configured to be facing a brake drum when the brake backplate is mounted on a motor vehicle, wherein the rear surface of the brake backplate includes a support base configured to receive a pull spindle of an electromechanical actuator, and
a supporting bracket including at least one coupling plate, configured to be attached to the rear surface of the brake backplate, and an actuator mounting surface configured to be coupled to and support the electromechanical actuator, wherein the actuator mounting surface includes a spindle seat, configured to receive the pull spindle of the electromechanical actuator, and a pin lock seat, configured to receive and lock an engagement pin of the electromechanical actuator,
wherein the rear surface of the brake backplate is provided with at least one first mechanical member and the at least one coupling plate is provided with respective at least one second mechanical member, wherein the at least one first mechanical member and the respective at least one second mechanical member are configured to engagedly slidably interact with each other, and wherein the spindle seat is configured to be connected to the electromechanical actuator through a bayonet fitting including a release configuration and a lock configuration, and the pin lock seat is configured to lock the engagement pin when the pull spindle is inserted into the spindle seat and the electromechanical actuator is rotated about a longitudinal axis of the pull spindle from the release configuration to the lock configuration of the bayonet fitting between the spindle seat and the electromechanical actuator.

According to another embodiment, the at least one first mechanical member may comprise a retaining member and the respective at least one second mechanical member may comprise a receiving member.

According to a further embodiment, the retaining member may be a hook and the receiving member may be a hook seat.

According to an additional embodiment, the hook seat may be provided with a ribbed area configured to contact the hook when the latter is on the hook seat, whereby the hook and the hook seat are configured to engagedly slidably interact with each other through an interference fitting.

According to another embodiment, the spindle seat may be provided with a bush protruding in opposite direction to the actuator mounting surface and having a bush end configured to touch, and optionally be supported by, the support base when the supporting bracket is attached to the rear surface of the brake backplate.

According to a further embodiment, the actuator mounting surface may be provided with a snap-fit tongue and a limit stop, wherein the snap-fit tongue and the limit stop are configured to interact with a positioning tooth of the electromechanical actuator such that, when the electromechanical actuator is rotated about the longitudinal axis of the pull spindle from the release configuration to the lock configuration of the bayonet fitting between the spindle seat and the electromechanical actuator, the positioning tooth is kept between the snap-fit tongue and the limit stop through a snap-fit connection.

According to an additional embodiment, the brake backplate may be provided with a threaded through hole configured to receive a safety screw or bolt or rivet, and wherein the at least one coupling plate may be provided with a through hole configured to receive the safety screw or bolt or rivet, whereby the supporting bracket is configured to be attached to the rear surface of the brake backplate through the safety screw or bolt or rivet.

According to another embodiment, the through hole of the at least one coupling plate may be accessible through an aperture on the actuator mounting surface.

According to a further embodiment, the pin lock seat may be interposed between the spindle seat and the snap-fit tongue on the actuator mounting surface.

According to an additional embodiment, the aperture on the actuator mounting surface may be interposed between the spindle seat and the pin lock seat.

According to another embodiment, the bayonet fitting through which the spindle seat is configured to be connected to the electromechanical actuator may be configured to allow the electromechanical actuator to rotate anticlockwise about the longitudinal axis of the pull spindle from the release configuration to the lock configuration of the bayonet fitting between the spindle seat and the electromechanical actuator.

It is also specific subject matter of the present invention a supporting bracket including:
  at least one coupling plate, configured to be attached to a rear surface, provided with at least one first mechanical member, of a brake backplate of a drum brake, and
  an actuator mounting surface configured to be coupled to and support an electromechanical actuator, wherein the actuator mounting surface includes a spindle seat, configured to receive a pull spindle of the electromechanical actuator, and a pin lock seat, configured to receive and lock an engagement pin of the electromechanical actuator,
  wherein the at least one coupling plate is provided with respective at least one second mechanical member configured to engagedly slidably interact with the at least one first mechanical member, and wherein the spindle seat is configured to be connected to the electromechanical actuator through a bayonet fitting including a release configuration and a lock configuration, and the pin lock seat is configured to lock the engagement pin when the pull spindle is inserted into the spindle seat and the electromechanical actuator is rotated about a longitudinal axis of the pull spindle from the release configuration to the lock configuration of the bayonet fitting between the spindle seat and the electromechanical actuator.

In one or more embodiments, a brake backplate of a drum brake, having a rear surface opposite to a front surface configured to be facing a brake drum when the brake backplate is mounted on a motor vehicle, wherein the rear surface of the brake backplate includes a support base configured to receive a pull spindle of an electromechanical actuator, wherein the brake backplate is provided with at least one first mechanical member configured to engagedly slidably interact with respective at least one second mechanical member of at least one coupling plate of a supporting bracket.

According to an additional embodiment, the at least one first mechanical member comprises a hook configured to engagedly slidably interact with a hook seat of the at least one coupling plate of the supporting bracket.

The advantages offered by the electric parking brake actuator mounting assembly, including a supporting bracket are numerous.

First of all, the electric parking brake actuator mounting assembly allows standard actuators to be used for different applications, since the supporting bracket provides an actuator support that adapts to the space available avoiding any need to modify the shape of the actuator housing depending on the specific mounting conditions imposed by the related motor vehicle.

Moreover, the electric parking brake actuator mounting assembly according to the invention enables reasonable and reliable fitting of the actuator in the correct position for use.

Also, the electric parking brake actuator mounting assembly according to the present invention provides for a robust, stable and reliable mounting process with especially non-constrained fitting and coupling of the respective miniaturised electromechanical standard actuator module to the vehicles brake backplate, and also protects for disengagement during brake application or brake release under the vehicular parking conditions over lifetime and without brake service.

BRIEF DESCRIPTION OF THE DRAWINGS

The present embodiments will be now described, by way of illustration and not by way of limitation, by particularly referring to the Figures of the annexed drawings, in which:

FIG. 2a shows a front perspective view of the supporting bracket of the electric parking brake actuator mounting assembly configured to be attached to the drum brake backplate of FIG. 1;

FIG. 2b shows a first rear perspective view of the supporting bracket of the electric parking brake actuator mounting assembly configured to be attached to the drum brake backplate of FIG. 1;

FIG. 2c shows an enlarged portion of a second rear perspective view of the supporting bracket of the electric parking brake actuator mounting assembly configured to be attached to the drum brake backplate of FIG. 1;

FIG. 8a shows a first rear perspective view of the supporting bracket of the electric parking brake actuator mounting assembly according to one or more embodiments;

FIG. 8b shows a second rear perspective view, of the supporting bracket of the electric parking brake actuator mounting assembly according to one or more embodiments; and FIG. 8c shows a third rear perspective view of the supporting bracket of the electric parking brake actuator mounting assembly according to one or more embodiments.

DETAILED DESCRIPTION OF THE EMBODIMENTS

Figure 1:
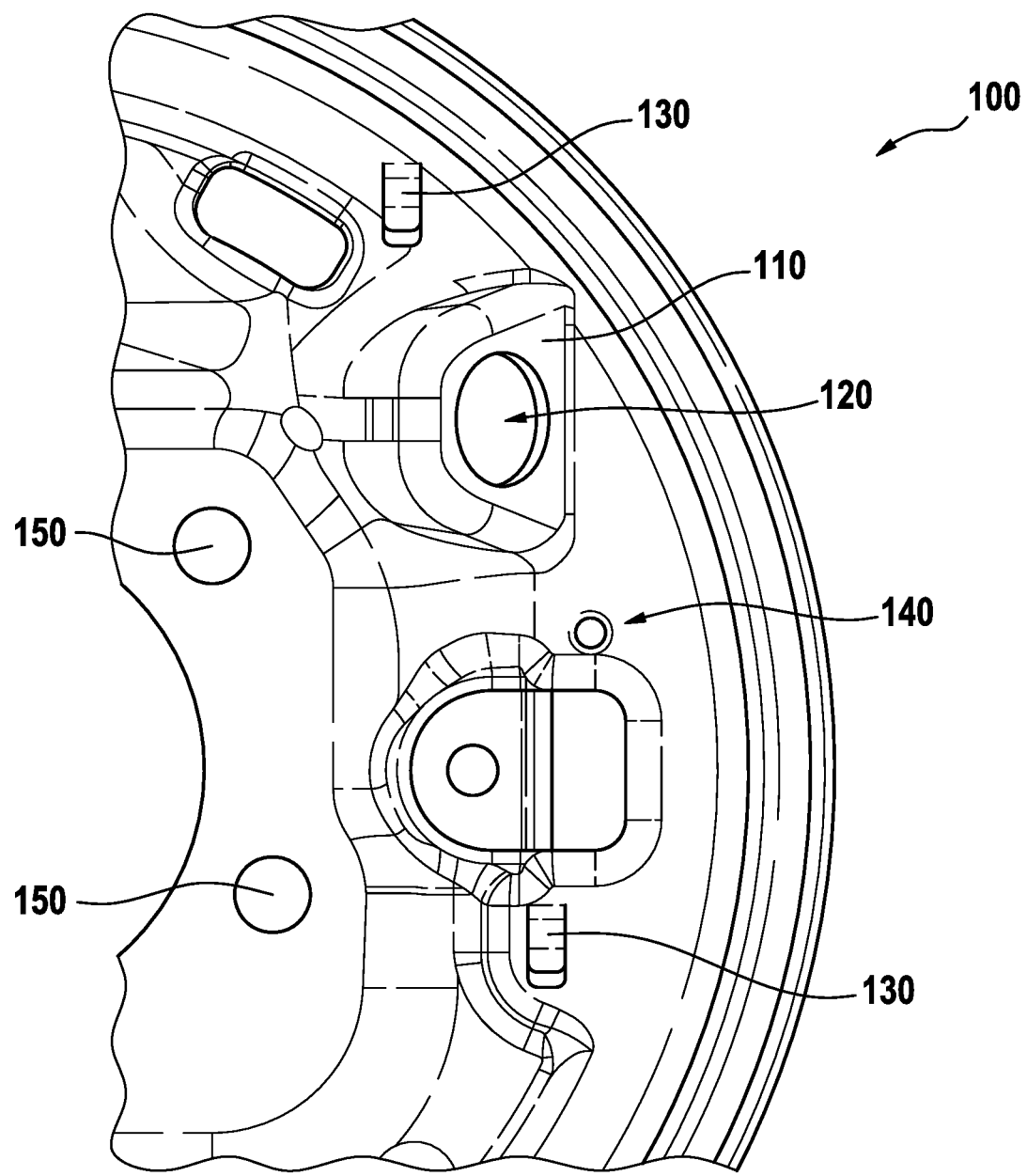
FIG. 1 shows a partial rear view of the drum brake backplate of an electric parking brake actuator mounting assembly according to one or more embodiments.

FIG. 1 shows a portion of the drum brake backplate 100 of one or more embodiments of the electric parking brake actuator mounting assembly according to the invention; namely, FIG. 1 shows the rear surface of the drum brake backplate 100 opposite to the front surface that is configured to be facing the brake drum when the brake backplate 100 is installed and operative.

Figure 3A:
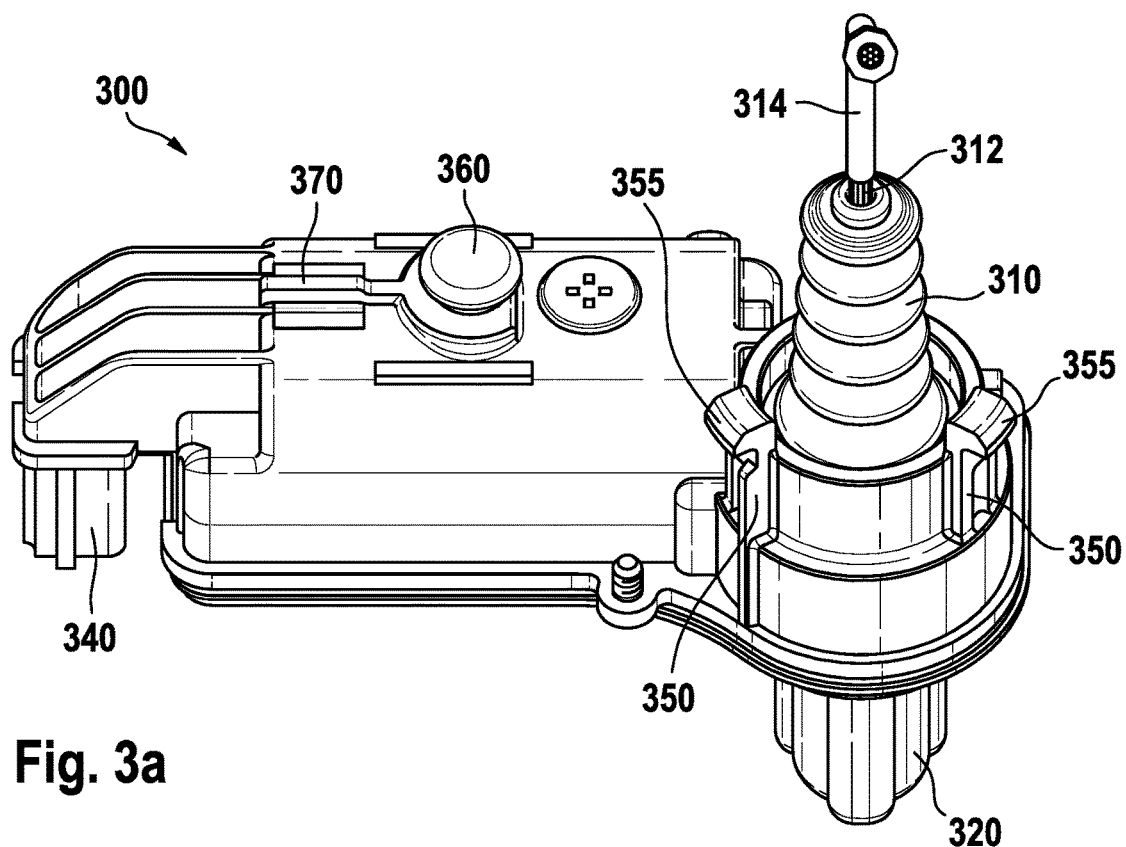
FIG. 3a shows a first rear perspective view of the electromechanical actuator of the electric parking brake actuator mounting assembly configured to be attached to the the supporting bracket of FIGS. 2a-c.
Figure 3B:
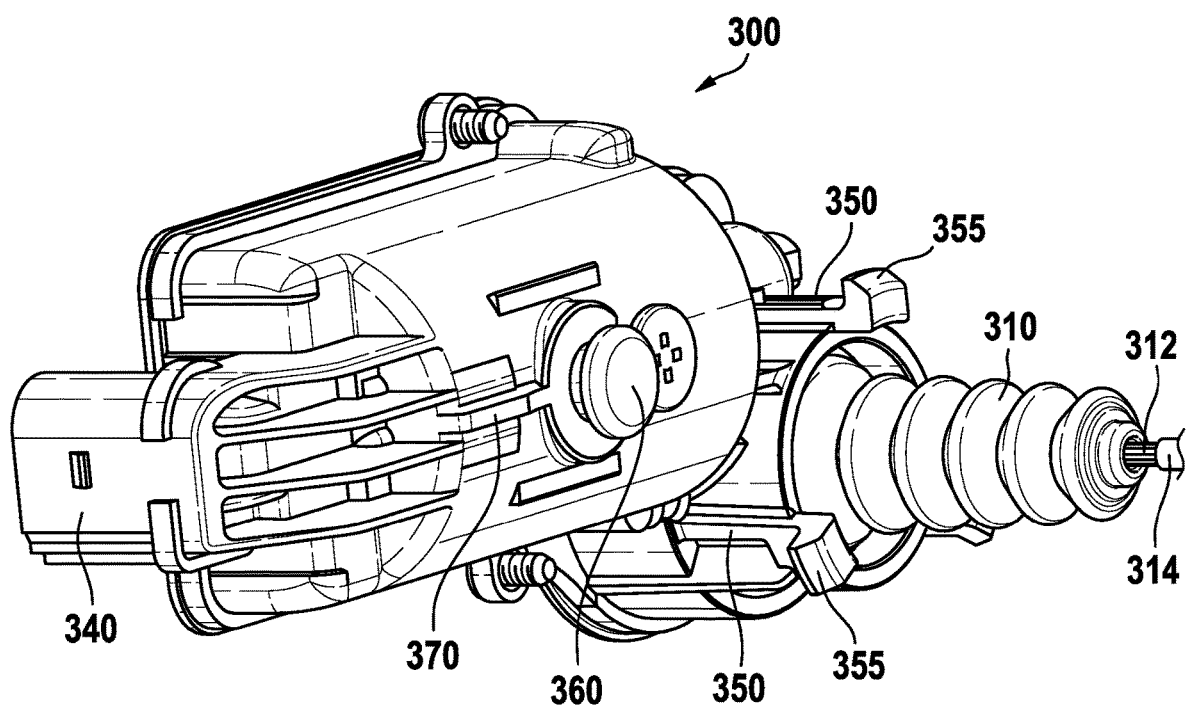
FIG. 3b shows a second rear perspective view of the electromechanical actuator of the electric parking brake actuator mounting assembly configured to be attached to the the supporting bracket of FIGS. 2a-c.
Figure 4A:
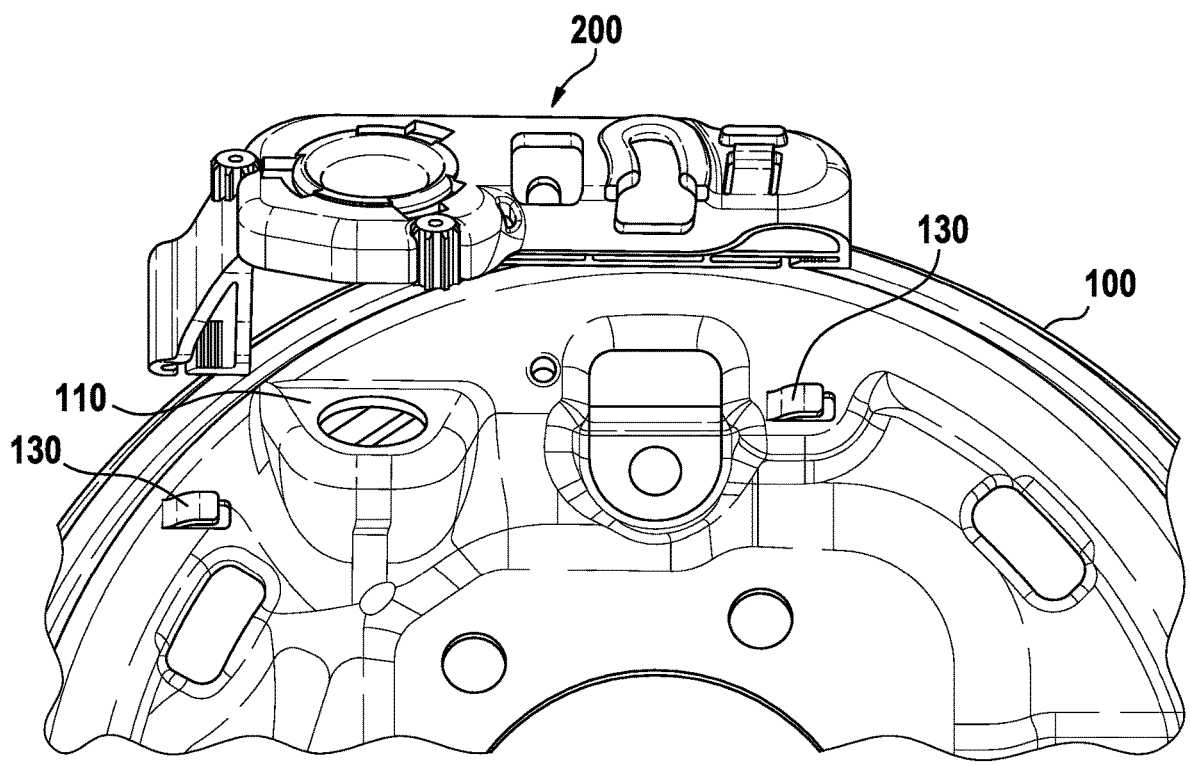
FIGS. 4a-4d show partial perspective views relating to respective steps of attaching the supporting bracket of FIGS. 2a-c to the brake backplate of FIG. 1 and to the electromechanical actuator of FIG. 3a-b.
Figure 4B:
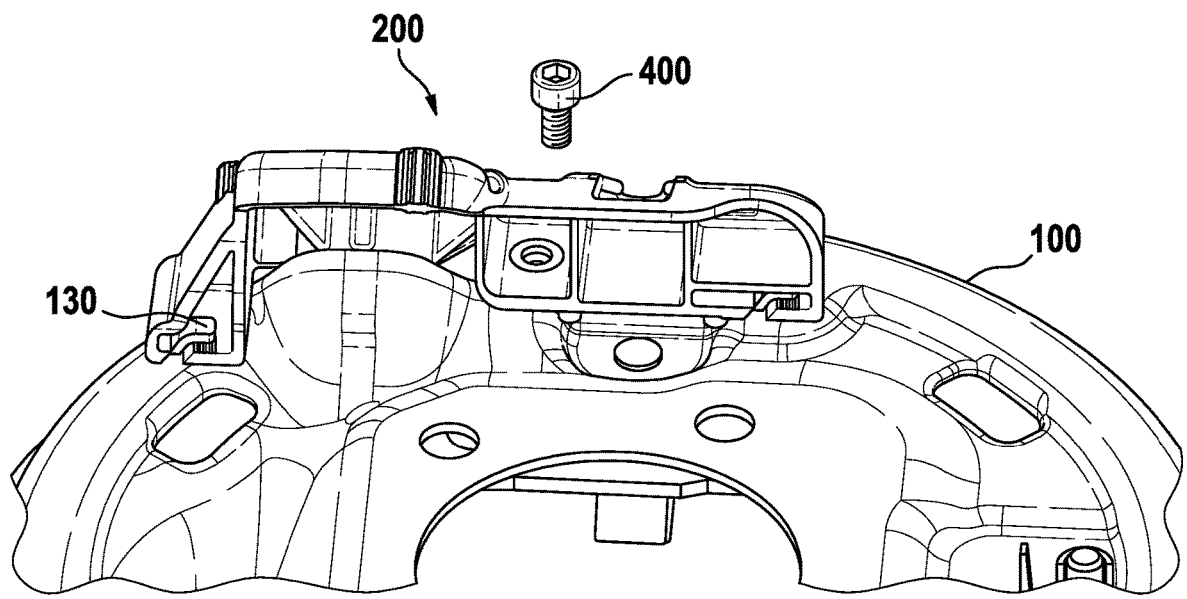
Figure 4C:
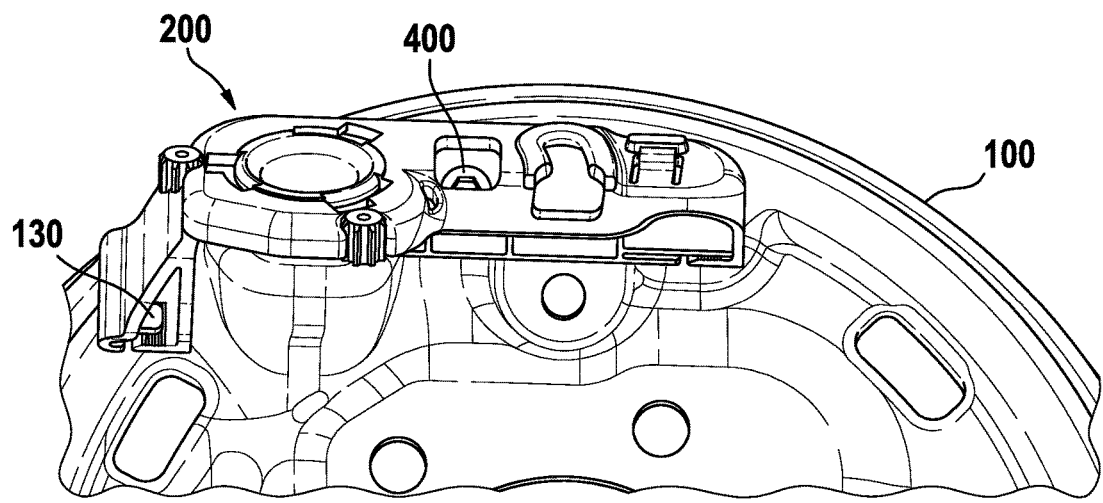
Figure 4D:
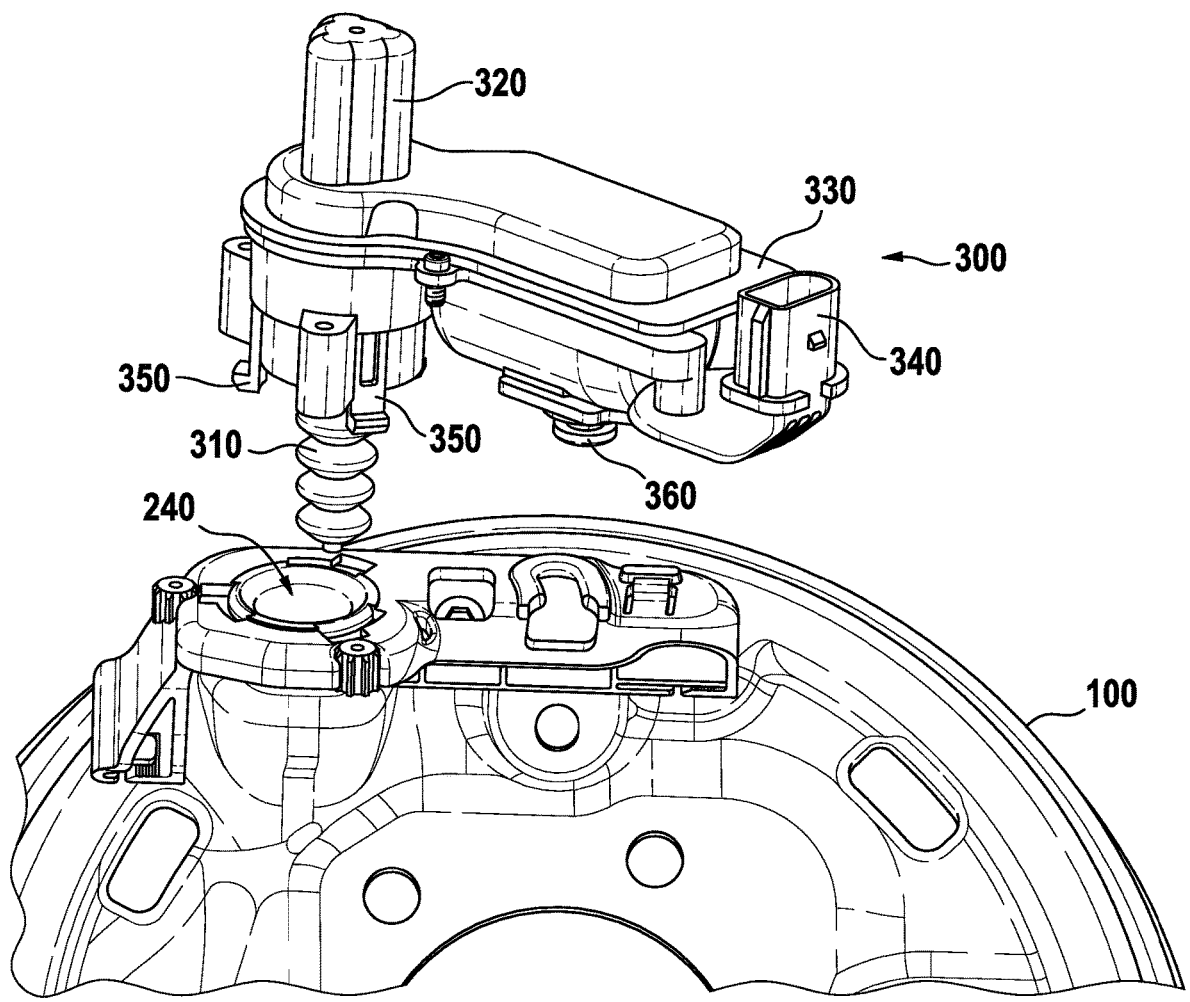

The rear surface of the brake backplate 100 has a support base 110 provided with a central aperture 120 configured to receive the pull spindle 310 of an electromechanical actuator 300, shown in FIGS. 3 and 4d; although in the present description reference numeral "310" is used with reference to the pull spindle 310, it must be noted that it actually indicates the flexible cover, shaped as a bellow, housing the pull spindle, from which a cable 312 exits (as shown in FIG. 3), where the cable 312 is provided with an end connector 314 configured to connect the pull spindle to the actuation mechanism operating the brake shoes. The support base 110 has a substantially planar support surface that obliquely protrudes from the rear surface of the brake backplate 100 (although the shape of the support base 110 is not an essential feature for the invention); in particular, the substantially planar support surface of the support base 110 is inclined with respect to the rear surface of the brake backplate 100 by an angle of approximately 45°. Two hooks 130 protrudes from the rear surface of the brake backplate 100, optionally on opposite sides of the support base 110; for instance, the hooks 130 can be manufactured by stamping. The brake backplate 100 is also provided with a threaded through hole 140 configured to receive a safety screw or bolt 400 (shown in FIGS. 4b, 4c, 6 and 7a). Furthermore, the brake backplate 100 has other conventional elements, such as through holes 150 configured to receive bolts (not shown), commonly used for mounting the brake backplate 100 on a motor vehicle, e.g. on a suspension assembly of a wheel.

In one or more embodiments of the electric parking brake actuator mounting assembly according to the invention further comprises a supporting bracket 200, shown in FIG. 2, configured to be interposed between and attached to the rear surface of the brake backplate 100 and the electromechanical actuator 300. The supporting bracket 200 includes first and second coupling plates 205 and 210, configured to be attached to the rear surface of the brake backplate 100, and an actuator mounting surface 230, configured to be coupled to and support the electromechanical actuator 300.

Figure 6:
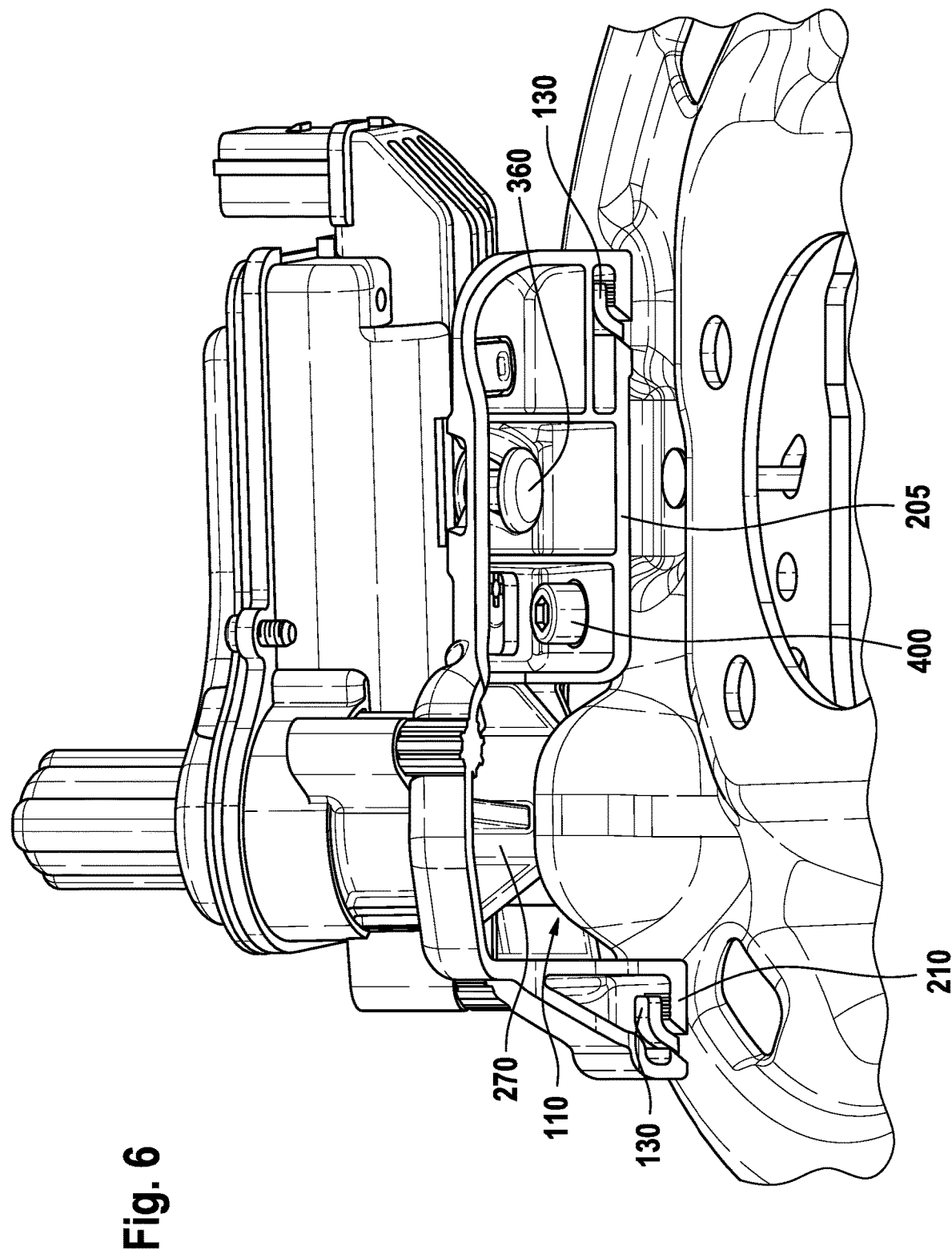
FIG. 6 shows a partial perspective view of the electromechanical actuator of FIG. 3a-b, the supporting bracket of FIG. 2a-c, and the brake backplate of FIG. 1 attached to each other.
Figure 7B:
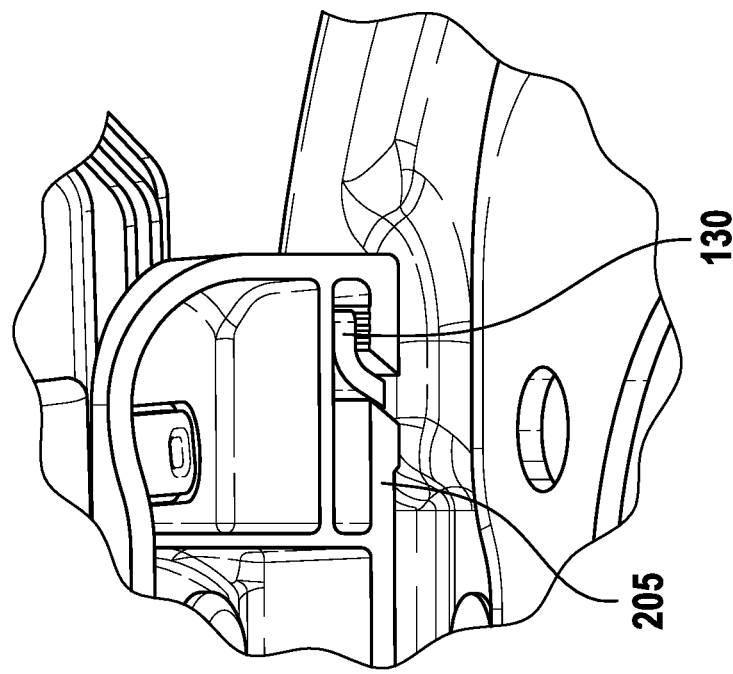
FIG. 7b show an enlarged portion of a portion of the view of FIG. 6.
Figure 7A:
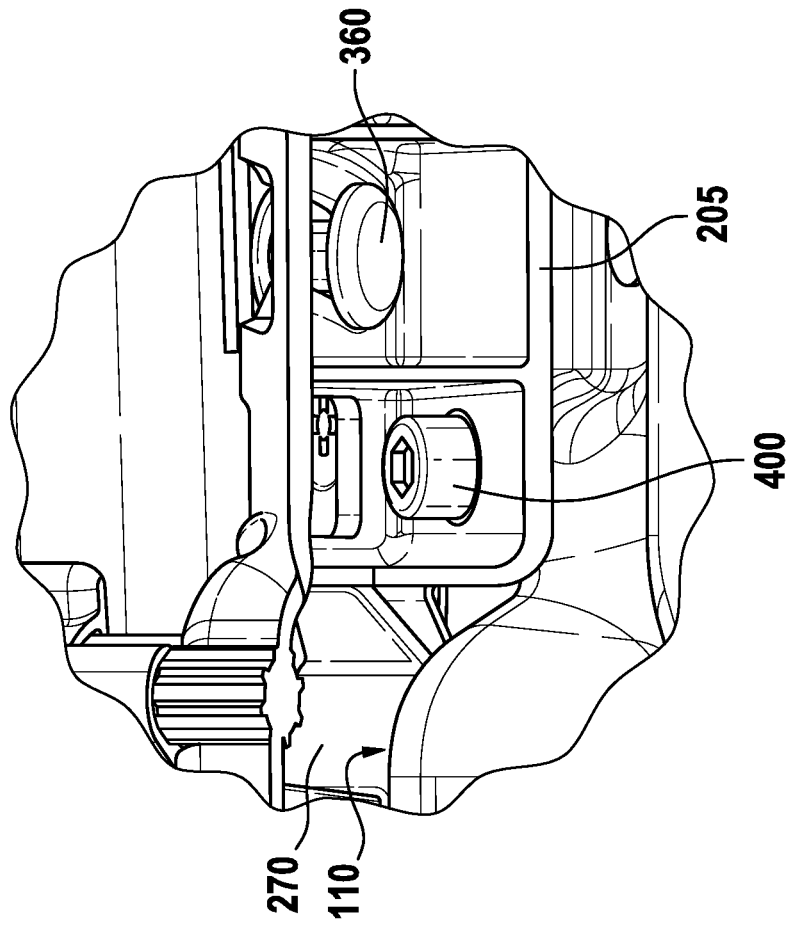
FIG. 7a show an enlarged portion of a portion of the view of FIG. 6.

The actuator mounting surface 230 of the supporting bracket 200 is provided with a spindle seat 240 configured to receive the pull spindle 310 of the electromechanical actuator 300; although the spindle seat 240 is circular, this is not an essential feature for the invention. The spindle seat 240 is provided with a bush 270 protruding in opposite direction to the actuator mounting surface 230 and having a bush end 275 configured to touch, and optionally be supported by, the support base 110 of the brake backplate 100 when the supporting bracket 200 is attached to the rear surface of the brake backplate 100, as shown in FIGS. 6 and 7a. The spindle seat 240 is laterally provided with three bayonet slots 245 which are uniformly angularly distributed around the spindle seat 240. Each bayonet slot 245 is conventionally shaped so as to include a receiving portion and a locking portion, wherein the receiving portion has a width larger than the width of the locking portion. As shown in FIG. 4d, the receiving portion is configured to receive a respective projecting element 350 of the electromechanical actuator 300, better shown in FIG. 3, extending laterally and parallel to the pull spindle 310 and provided with an end tooth 355 that is kept by the locking portion of the respective bayonet slot 245 below the actuator mounting surface 230 when, once that the projecting element 350 has been inserted into the receiving portion (whereby the pull spindle 310 is inserted into the spindle seat 240), the electromechanical actuator 300 is rotated anticlockwise about the longitudinal axis of the pull spindle 310 from a release configuration, shown in FIG. 5a, to a lock configuration, shown in FIG. 5b. Namely, such anticlockwise rotation of the electromechanical actuator 300 causes the projecting element 350 to slide from the receiving portion to the locking portion of the respective bayonet slot 245, whereby the spindle seat 240 is connected to the electromechanical actuator 300 through a bayonet fitting such that the pull spindle 310 is kept inserted into the spindle seat 240.

Moreover, the actuator mounting surface 230 of the supporting bracket 200 is provided with a pin lock seat 250 having an external receiving portion and an internal locking portion, wherein the external receiving portion has a width larger than the width of the internal locking portion. As shown in FIGS. 4d, 5, 6 and 7a, the external receiving portion is configured to receive an engagement pin 360 of the electromechanical actuator 300, also shown in FIG. 3, that is kept in position by the internal locking portion; in particular, once that the projecting elements 350 have been inserted into the receiving portion of the respective bayonet slots 245 (whereby the pull spindle 310 is inserted into the spindle seat 240), when the electromechanical actuator 300 is rotated anticlockwise about the longitudinal axis of the pull spindle 310 as shown from FIG. 5a to FIG. 5b, the engagement pin 360 is caused to move from the external receiving portion to the internal locking portion of the pin lock seat 250, whereby the engagement pin 360 is held by the internal locking portion of the pin lock seat 250. Advantageously, as shown in FIG. 3, the engagement pin 360 extends along an axis passing through (or in proximity to) the centre of gravity of the electromechanical actuator 300.

Also, the actuator mounting surface 230 of the supporting bracket 200 is provided with a snap-fit tongue 260, having an end tooth 262, and a limit stop 265, wherein the snap-fit tongue 260 and the limit stop 265 are configured to interact with a positioning tooth 370 of the electromechanical actuator 300 so as to implement a snap-fit connection aimed at signalling the proper positioning of the electromechanical actuator 300 on the supporting bracket 200 and at preventing inadvertent disengagement of the electromechanical actuator 300 from the supporting bracket 200, e.g. by hand or due to vibrations. In particular, once that the projecting elements 350 have been inserted into the receiving portion of the respective bayonet slots 245 (whereby the pull spindle 310 is inserted into the spindle seat 240), when the electromechanical actuator 300 is rotated anticlockwise about the longitudinal axis of the pull spindle 310 as shown from FIG. 4a to FIG. 4b, the positioning tooth 370 of the electromechanical actuator 300 causes the snap-fit tongue 260 to elastically bend far from the electromechanical actuator 300 until the positioning tooth 370 reaches the limit stop 265, whereby the snap-fit tongue 260 returns to its rest position conventionally producing the typical noise of snap fitting, thus signalling the proper positioning of the electromechanical actuator 300 on the supporting bracket 200, and the positioning tooth 370 stably remains between the end tooth 262 of the snap-fit tongue 260 and the limit stop 265.

As shown in FIG. 2, the spindle seat 240, the pin lock seat 250 and the snapfit tongue 260 are arranged such that the pin lock seat 250 is interposed between the spindle seat 240 and the snap-fit tongue 260. It must be noted that other embodiments of the electric parking brake actuator mounting assembly may have a different arrangement, whereby the snap-fit tongue 260 can be interposed between the spindle seat 240 and the pin lock seat 250 or the spindle seat 240 can even be interposed between the snap-fit tongue 260 and the pin lock seat 250.

Furthermore, the actuator mounting surface 230 of the supporting bracket 200 is provided with two screw seats 280, arranged in correspondence with the receiving portion of two respective bayonet slots 245, which are configured to receive respective bolts or screws for additionally fastening the electromechanical actuator 300 to the supporting bracket 200. However, it must be noted that other embodiments of the electric parking brake actuator mounting assembly may be devoid of such screw seats 280, and even for those embodiments having one or more screw seats similar to those indicated with the reference numerals 280 in FIG. 2, such additional fastening is not essential for the invention.

As shown in FIGS. 2b, 4a and 6, the first and second coupling plates 205 and 210 of the supporting bracket 200 are separated from each other by the bush 270, whereby the first and second coupling plates 205 and 210 do not even interfere with the support base 110 when the supporting bracket 200 is attached to the rear surface of the brake backplate 100. However, other embodiments of the electric parking brake actuator mounting assembly may have a different number of coupling plates, for instance one single coupling plate or more than two coupling plates, shaped so as to be not interfering with the bush 270 and the support base 110 when the supporting bracket 200 is attached to the rear surface of the brake backplate 100.

As shown in FIGS. 2b, 2c, 4a, 6 and 7b, the first and second coupling plates 205 and 210 of the supporting bracket 200 are provided with respective hook seats 220, each comprising hook positioning slots and provided with a ribbed area 225 (as clearly shown in FIG. 2c) configured to contact a hook 130 when the latter is on the hook seat 220 having such ribbed area 225. The two hook seats 220 are advantageously arranged in correspondence of two ends of the supporting bracket 200. The two hook seats 220 are reciprocally positioned according to the mutual positions of the two hooks 130 protruding from the rear surface of the brake backplate 100.

Also, as shown in FIGS. 2a, 2b, 4a and 4b, the first coupling plate 205 is provided with a through hole 215 configured to receive a safety screw or bolt 400 (shown in FIGS. 4b, 4c, 6 and 7a); an aperture 290 on the actuator mounting surface 230 allows an operator to access the through hole 215 (e.g. through a screwdriver). As shown in FIG. 2, the aperture 290 is interposed between the spindle seat 240 and the pin lock seat 250 (although this is not an essential feature for the invention). The through hole 215 is positioned with respect to the two hook seats 220 as the threaded through hole 140 of the brake backplate 100 is positioned with respect to the two hooks 130 of the rear surface thereof, whereby when the supporting bracket 200 is positioned on the rear surface of the brake backplate 100 with the two hook seats 220 in correspondence of the two hooks 130, the through hole 215 of the first coupling plate 205 is in correspondence of the threaded through hole 140 of the brake backplate 100.

The structure of the supporting bracket 200 is conventionally provided with stiffening walls.

The first and second coupling plates 205 and 210 are inclined with respect to the actuator mounting surface 230 by an angle of approximately 45°; however, this is not an essential feature for the invention. Also, other embodiments of the electric parking brake actuator mounting assembly may have (one or more) coupling plates substantially parallel to the actuator mounting surface 230, and the (one or more) coupling plates may be joined to the actuator mounting surface 230 through one or more lateral walls.

As shown in FIG. 4a, in order to attach the supporting bracket 200 to the brake backplate 100, the supporting bracket 200 is first caused to slide on the rear surface of the brake backplate 100 so as to make the two hooks 130 of the latter slide in the respective hook seats 220 of the first and second coupling plates 205 and 210 of the supporting bracket 200. The ribbed areas 225 ensure a matching through an interference fitting between hooks 130 and respective hook seats 220 so as to take up any clearance between them and to guarantee a stable coupling under any tolerance condition.

Then, as shown in FIG. 4b, once the supporting bracket 200 has reached the proper attachment position, the through hole 215 of the first coupling plate 205 is in correspondence of the threaded through hole 140 of the brake backplate 100 and, as shown in FIG. 4c, a safety screw or bolt 400 is screwed into the threaded through hole 140 of the brake backplate 100 from the through hole 215 of the first coupling plate 205 (accessed from the aperture 290 on the actuator mounting surface 230). The safety screw or bolt 400 reliably ensures a long duration of the matching between the supporting bracket 200 and the brake backplate 100. Other embodiments of the electric parking brake actuator mounting assembly may have alternative conventional fastening components for attaching the supporting bracket 200 to the brake backplate 100, such as a rivet inserted into the through hole 140 of the brake backplate 100 (whereby the through hole 140 can be unthreaded).

Afterwards, an electromechanical actuator 300 (shown in FIGS. 3 and 4d) is attached to the supporting bracket 200. The electromechanical actuator 300 comprises a pull spindle 310 extending substantially the same longitudinal axis of a cap 320, from which a mechanical cable (not shown) connected to the pull spindle 310 exits, wherein the pull spindle 310 and the cap 320 extend on opposite sides of the actuator body 330. The actuator body 330 houses an electric motor configured to move the pull spindle 310 when the electric motor is supplied by an electric unit 340 controlled by external electrical wires (not shown).

Figure 5A:
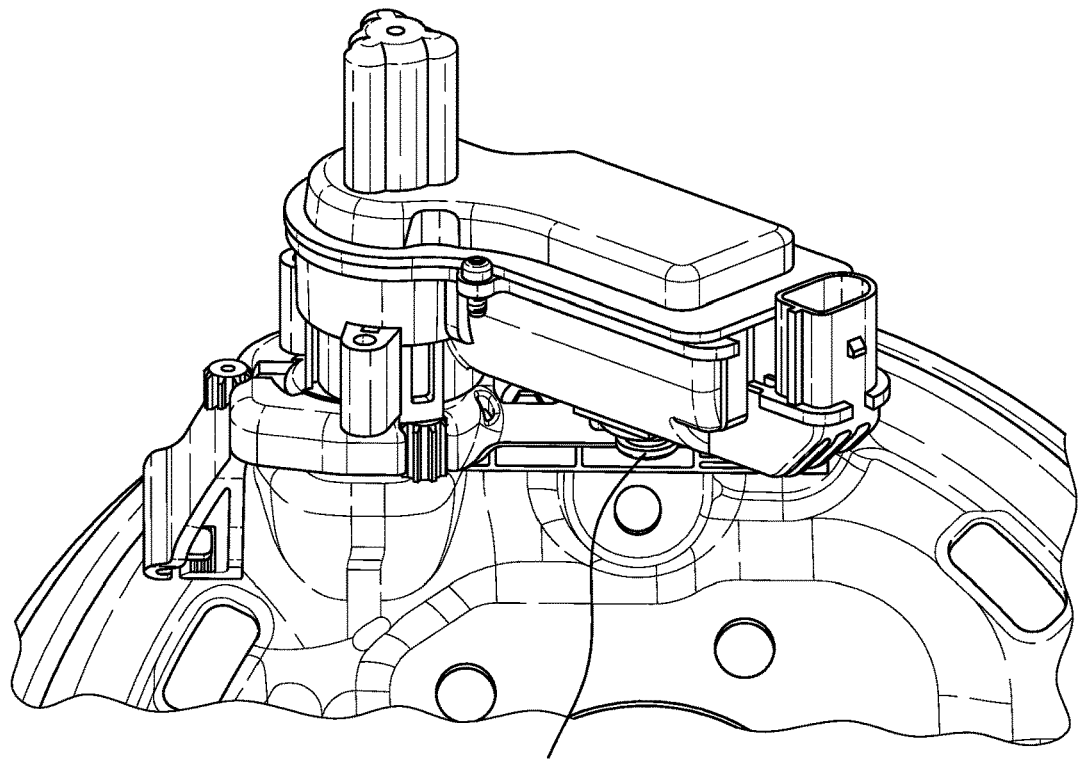
FIG. 5a shows partial perspective views of a release configuration of the attachment of the electromechanical actuator of FIG. 3a-b to the supporting bracket of FIG. 2a-c attached to the brake backplate of FIG. 1.

As shown in FIGS. 4d and 5a, the projecting elements 350 of the electromechanical actuator 300 are inserted into the receiving portion of the respective bayonet slots 245 (whereby the pull spindle 310 is inserted into the spindle seat 240).

Figure 5B:
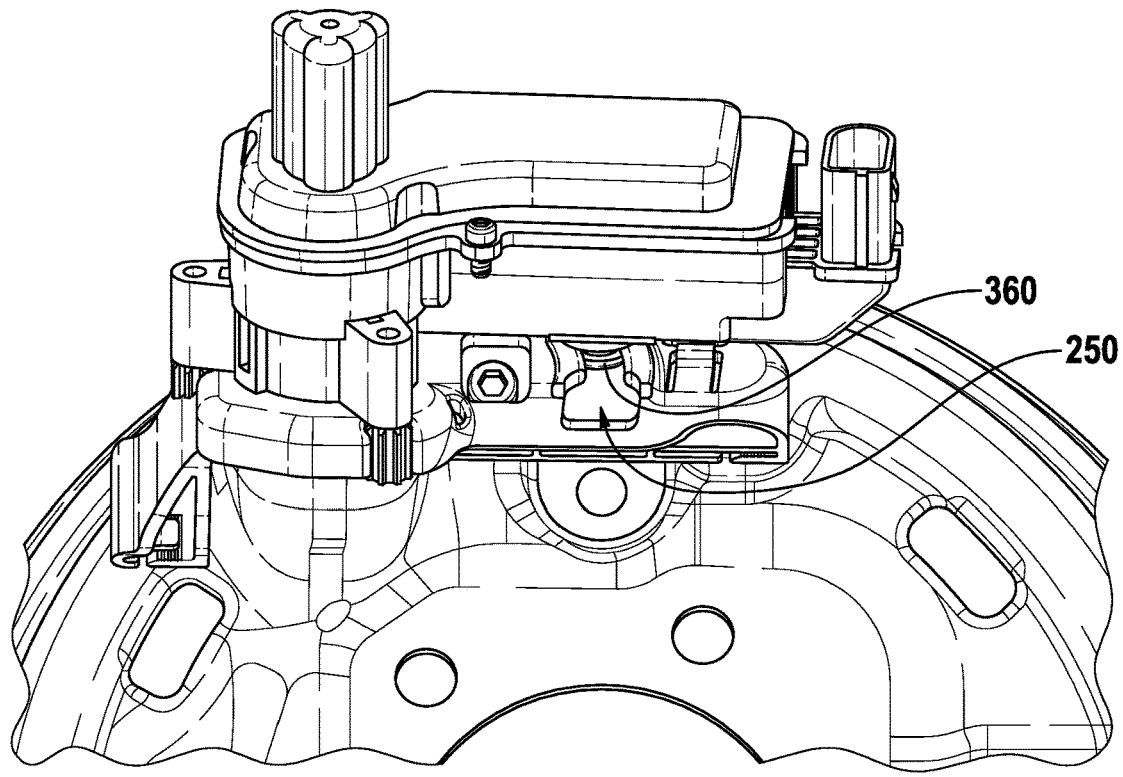
FIG. 5b shows a lock configuration of the attachment of the electromechanical actuator of FIG. 3a-b to the supporting bracket of FIG. 2a-c attached to the brake backplate of FIG. 1.

Then, the electromechanical actuator 300 is rotated anticlockwise about the longitudinal axis of the pull spindle 310 until the positioning tooth 370 of the electromechanical actuator 300 reaches the limit stop 265, as shown from FIG. 5a to FIG. 5b, whereby the projecting elements 350 are kept in the respective bayonet slots 245, the engagement pin 360 is locked in the pin lock seat 250, and the positioning tooth 370 of the electromechanical actuator 300 is kept between the snap-fit tongue 260 and the limit stop 265. This final configuration is also shown in FIG. 6.

The supporting bracket 200 is configured so as to withstand any strains caused by the operation of the electromechanical actuator 300 and also by vibrations due to the movement of the motor vehicle, especially when the engagement pin 360 advantageously extends along an axis passing through (or in proximity to) the centre of gravity of the electromechanical actuator 300.

Other embodiments of the electric parking brake actuator mounting assembly may have a different number of pairs of corresponding hooks 130 and hook seats 220, for instance three or more hooks and three or more respective hook seats, and even only a single hook and a single respective hook seat; in the latter case, the one or more coupling plates of the supporting bracket 200 are advantageously fastened to the brake backplate 100 by means of one or more safety screws or bolts (similar to the one indicated in FIGS. 4, 6 and 7a with the reference numeral 400).

Also, in further embodiments of the invention, the hooks 130 and hook seats 220 may be replaced with different retaining members (such as sliders) and receiving members (such as loops or rings), respectively.

Furthermore, in other embodiments, the arrangement of the hooks (or retaining members) and hook seats (or receiving members) can be exchanged between the supporting bracket 200 and the brake backplate 100, whereby hooks can be arranged on the latter and hook seats can be arranged on the former. In general terms, the brake backplate is provided with at least one first mechanical member and the supporting bracket is provided with respective at least one second mechanical member, wherein the at least one first mechanical member and the respective at least one second mechanical member are configured to engagedly slidably interact with each other.

FIG. 8 shows the supporting bracket 800 of another embodiment of the electric parking brake actuator mounting assembly according to the invention, differing as follows from the supporting bracket 200 of the embodiment of FIGS. 1-7 in that the hook seats 820 of the supporting bracket 800 are shaped so as to facilitate the positioning of the respective hooks 130 of the rear surface of the brake backplate 100 on the same. In particular, the hook positioning slot of each hook seat 820 comprises an external enlarged entry defined by opposed sloping edges to facilitate the introduction of the respective hook 130 into the hook positioning slot; in other words, as shown in FIG. 8, the plan view of the hook positioning slot of each hook seat 820 is substantially Y-shaped. Also, each hook seat 820 has a sliding plane portion having an increasing thickness from the external edge 806 or 811 of the first or second coupling plate 805 or 810 to the ribbed area 825; this is clearly shown in FIG. 8a where the thickness d of the edge 806 of the first coupling plate 805 in correspondence with the ribbed area 825 is lower than the normal thickness D of the edge 807 of the first coupling plate 805, namely the edge 807 far from the ribbed area 825. As stated, both the external enlarged entry and the sliding plane portion of each hook seat 820 facilitate sliding of the hook seats 820 beneath the respective hooks 130.

Furthermore, in the supporting bracket 800 of FIG. 8, the ribbed area 825 of each hook seat 820 is provided with ribs projecting upwards from the first or second coupling plate 805 or 810 by a height increasing from the ends of the ribs directed towards the edge 806 or 811 to the ends of the ribs directed to the inside of the first or second coupling plate 805 or 810 (such that each rib defines a sort of ramp). When the hook seats 820 slide beneath the respective hooks 130, the ribs of the ribbed area 825 are drawn by the hooks 130.

In any embodiment supporting bracket 200, 800 and/or actuator housing may independently or both be designed in sheet metal or other highly ductile material, especially ductile plastics material which especially performs very well for non-constrained self-tolerance e.g. the self-matching interface coupling process concerning the respective components under engagement and also serves for reliably safe interconnection of the assembled parking brake module when fixed to the automobile axle component or anchor plate. Especially when the supporting bracket 200, 800 and/or actuator housing is completely made of such highly ductile material, especially plastics, a self-elimination effect of unwanted clearance between the hooks 130 and the respective hook seats 820 is achieved, thereby also ensuring improved self-matching properties when the component mounting process started. A combined sandwich component e.g. compound of elastic steel and elastic plastics material remains possible when appropriate. Plastics material may be homogenious and integrate a certain amount of woven or non woven fiber segments e.g. fiber fabrics or fiber segments that are in maximum below 50% of the complete brackets weight. Inhomogenious concentration of fabrics, fibers or parts therefrom in heavy duty areas only remains both—positive and possible. Consequently such well integrated self interference and fitting may positively be implemented between the paired components in engagement through the inventions construction, and also a guaranteed, stable coupling under tolerance conditions is safeguarded. Dismounting of components e.g. for brake service task is also improved by the aspects described above.

Additionally, further embodiments of the electric parking brake actuator mounting assembly according to the invention may have a number of bayonet slots different from three items, e.g. for instance two or four or more, advantageously equi-angularly distributed around the spindle seat 240 so that non-constrained variation with self aligning is achieved.

Also, in other embodiments of the invention, the electromechanical actuator 300 may be attached to the supporting bracket 200 upon a clockwise rotation (instead of an anticlockwise rotation) about the longitudinal axis of the pull spindle 310.

Furthermore, additional embodiments of the electric parking brake actuator mounting assembly according to the invention may be devoid of any snap-fit connection between the electromechanical actuator 300 and the supporting bracket 200, whereby neither a snap-fit tongue nor a limit stop is present on the actuator mounting surface 230 and the electromechanical actuator 300 is devoid of any positioning tooth.

Moreover, in further embodiments of the invention, both the hooks 130 and the hook seats 220 may be provided with respective ribbed areas configured to contact each other when the hooks 130 are on the respective hook seats 220. Alternatively, in other embodiments of the invention, neither the hooks nor the hook seats are provided with any ribbed area. In further alternative embodiments of the invention, the hook seats may be devoid of any ribbed area, while the hooks may be provided with respective ribbed areas configured to contact a hook seat when the hook having such ribbed area is on the hook seat.

The embodiments of this invention have been described and a number of variations have been suggested hereinbefore, but it should be understood that those skilled in the art can make other variations and changes without so departing from the scope of protection thereof, as defined by the attached claims.

The invention claimed is:

1. An electric parking brake actuator mounting assembly comprising:
a brake backplate of a drum brake, having a rear surface opposite to a front surface configured to be facing a brake drum when the brake backplate is mounted on a motor vehicle, wherein the rear surface of the brake backplate includes a support base configured to receive a pull spindle of an electromechanical actuator;
a supporting bracket including at least one coupling plate, configured to be attached to the rear surface of the brake backplate, and an actuator mounting surface configured to be coupled to and support the electromechanical actuator, wherein the actuator mounting surface includes a spindle seat, configured to receive the pull spindle of the electromechanical actuator, and a pin lock seat, configured to receive and lock an engagement pin of the electromechanical actuator; and
wherein the rear surface of the brake backplate is provided with at least one first mechanical member and the at least one coupling plate is provided with respective at least one second mechanical member, wherein the at least one first mechanical member and the respective at least one second mechanical member are configured to engagedly slidably interact with each other, and wherein the spindle seat is configured to be connected to the electromechanical actuator through a bayonet fitting including a release configuration and a lock configuration, and the pin lock seat is configured to lock the engagement pin when the pull spindle is inserted into the spindle seat and the electromechanical actuator is rotated about a longitudinal axis of the pull spindle from the release configuration to the lock configuration of the bayonet fitting between the spindle seat and the electromechanical actuator.

2. The electric parking brake actuator mounting assembly according to claim 1, wherein the at least one first mechanical member comprises a retaining member and the respective at least one second mechanical member comprises a receiving member.

3. The electric parking brake actuator mounting assembly according to claim 2, wherein the retaining member is a hook and the receiving member is a hook seat.

4. The electric parking brake actuator mounting assembly according to claim 3, wherein the hook seat is provided with a ribbed area configured to contact the hook when the latter is on the hook seat, whereby the hook and the hook seat are configured to engagedly slidably interact with each other through an interference fitting.

5. The electric parking brake actuator mounting assembly according to claim 1, wherein the spindle seat is provided with a bush protruding in opposite direction to the actuator mounting surface and having a bush end configured to touch, and optionally be supported by, the support base when the supporting bracket is attached to the rear surface of the brake backplate.

6. The electric parking brake actuator mounting assembly according to claim 1, wherein the brake backplate is provided with a threaded through hole configured to receive a safety screw or bolt or rivet, and wherein the at least one coupling plate is provided with a through hole configured to receive the safety screw or bolt or rivet, whereby the supporting bracket is configured to be attached to the rear surface of the brake backplate through the safety screw or bolt or rivet.

7. The electric parking brake actuator mounting assembly according to claim 6, wherein the through hole of the at least one coupling plate is accessible through an aperture on the actuator mounting surface.

8. The electric parking brake actuator mounting assembly according to claim 7, wherein the aperture on the actuator mounting surface is interposed between the spindle seat and the pin lock seat.

9. The electric parking brake actuator mounting assembly according to claim 1, wherein the actuator mounting surface is provided with a snap-fit tongue and a limit stop, wherein the snap-fit tongue and the limit stop are configured to interact with a positioning tooth of the electromechanical actuator such that, when the electromechanical actuator is rotated about the longitudinal axis of the pull spindle with the pull spindle inserted into the spindle seat from the release configuration to the lock configuration of the bayonet fitting between the spindle seat and the electromechanical actuator, the positioning tooth is kept between the snap-fit tongue and the limit stop through a snap-fit connection.

10. The electric parking brake actuator mounting assembly according to claim 9, wherein the pin lock seat is interposed between the spindle seat and the snap-fit tongue on the actuator mounting surface.

11. The electric parking brake actuator mounting assembly according to claim 1, wherein the bayonet fitting through which the spindle seat is configured to be connected to the electromechanical actuator is configured to allow the electromechanical actuator to rotate anticlockwise about the longitudinal axis of the pull spindle from the release configuration to the lock configuration of the bayonet fitting between the spindle seat and the electromechanical actuator.

12. A supporting bracket comprising:
at least one coupling plate, configured to be attached to a rear surface, provided with at least one first mechanical member, of a brake backplate of a drum brake;
an actuator mounting surface configured to be coupled to and support an electromechanical actuator, wherein the actuator mounting surface includes a spindle seat, configured to receive a pull spindle of the electromechanical actuator, and a pin lock seat, configured to receive and lock an engagement pin of the electromechanical actuator; and
wherein the at least one coupling plate is provided with respective at least one second mechanical member configured to engagedly slidably interact with the at least one first mechanical member, and wherein the spindle seat is configured to be connected to the electromechanical actuator through a bayonet fitting including a release configuration and a lock configuration, and the pin lock seat is configured to lock the engagement pin when the pull spindle is inserted into the spindle seat and the electromechanical actuator is rotated about a longitudinal axis of the pull spindle from the release configuration to the lock configuration of the bayonet fitting between the spindle seat and the electromechanical actuator.

13. The supporting bracket according to claim 12, wherein the respective at least one second mechanical member comprises a hook seat configured to engagedly slidably interact with a hook of the rear surface of the brake backplate.

14. The supporting bracket according to claim 12, wherein at least the bracket is made from highly ductile material such as elastic steel and/or plastics material, especially from plastics material or a combined sandwich component e.g. compound of elastic steel and elastic plastics material.

15. The supporting bracket according to claim 14, wherein the plastics material integrates a certain amount of woven or non-woven fiber that are in maximum below 50% of the complete bracket weight.

16. A brake backplate of a drum brake, having a rear surface opposite to a front surface configured to be facing a brake drum when the brake backplate is mounted on a motor vehicle, wherein the rear surface of the brake backplate includes a support base configured to receive a pull spindle of an electromechanical actuator through a bayonet fitting defined by the support base, wherein the bayonet fitting defines a release configuration and a lock configuration, wherein the brake backplate is provided with at least one first mechanical member configured to engagedly slidably interact with respective at least one second mechanical member of at least one coupling plate of a supporting bracket; and
wherein the at least one first mechanical member comprises a hook configured to engagedly slidably interact with a hook seat of the at least one coupling plate of the supporting bracket.

17. A process for mounting an electromechanical actuator on an electric parking brake actuator mounting assembly, wherein the electromechanical actuator includes a pull spindle, having a longitudinal axis, and an engagement pin, the process comprising:
inserting the pull spindle into a spindle seat according to a release configuration of a bayonet fitting between the spindle seat and the electromechanical actuator; and
rotating the electromechanical actuator about the longitudinal axis of the pull spindle from the release configuration to a lock configuration of the bayonet fitting between the spindle seat and the electromechanical actuator, whereby the electromechanical actuator is rotated until a pin lock seat receives and locks the engagement pin.

18. The process according to claim 17, further comprising causing a supporting bracket to slide on a rear surface of a brake backplate up to reaching an attachment position at which the at least one first mechanical member and the respective at least one second mechanical member engagedly slidably interact with each other.

\* \* \* \* \*